US012694859B2

(12) United States Patent
Sheng et al.

(10) Patent No.: US 12,694,859 B2
(45) Date of Patent: Jul. 28, 2026

(54) ULTRA-LOW FREQUENCY ACOUSTIC ABSORBER

(71) Applicant: THE HONG KONG UNIVERSITY OF SCIENCE AND TECHNOLOGY, Hong Kong (CN)

(72) Inventors: Ping Sheng, Hong Kong (CN); Ho Yiu Mak, Hong Kong (CN); Xiaonan Zhang, Hong Kong (CN); Zhen Dong, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 290 days.

(21) Appl. No.: 18/287,760

(22) PCT Filed: Apr. 21, 2022

(86) PCT No.: PCT/CN2022/088104
§ 371 (c)(1),
(2) Date: Oct. 20, 2023

(87) PCT Pub. No.: WO2022/222984
PCT Pub. Date: Oct. 27, 2022

(65) Prior Publication Data
US 2024/0185822 A1 Jun. 6, 2024

Related U.S. Application Data

(60) Provisional application No. 63/178,548, filed on Apr. 23, 2021.

(51) Int. Cl.
*G10K 11/162* (2006.01)
*B32B 15/02* (2006.01)
*G10K 11/172* (2006.01)

(52) U.S. Cl.
CPC ............ *G10K 11/162* (2013.01); *B32B 15/02* (2013.01); *G10K 11/172* (2013.01)

(58) Field of Classification Search
CPC ..... B32B 15/02; G10K 11/172; G10K 11/162
See application file for complete search history.

(56) References Cited

U.S. PATENT DOCUMENTS 4,102,359 A * 7/1978 Patel ......................... F15D 1/02
138/40
4,135,603 A * 1/1979 Dean, III ............. G10K 11/172
428/116
(Continued)

FOREIGN PATENT DOCUMENTS

CN 103219862 A 7/2013
EP 0742322 A1 11/1996
(Continued)

*Primary Examiner* — Forrest M Phillips
(74) *Attorney, Agent, or Firm* — Nath, Goldberg & Meyer; Jerald L. Meyer

(57) ABSTRACT

The ultra-low frequency acoustic absorber (10) includes a hollow housing (12) having opposed first and second open ends (22, 24), and a plurality of metallic mesh layers (16) stacked within the housing (12). In order to secure the plurality of metallic mesh layers (16) within the hollow housing (12), first and second mesh covers (18, 20) may cover the first and second open ends (22, 24) of the hollow housing (12), respectively. At least one spacer (14) may be provided to form a gap between the housing (12) and a support surface, such as a hard wall (W) or the like. The at least one spacer (14) may have a length sufficient to space the ultra-low frequency acoustic absorber (10) at the position of optimal absorption based on an acoustic soft 10 boundary condition (ASBC).

21 Claims, 13 Drawing Sheets

(56) References Cited

U.S. PATENT DOCUMENTS

| | | | | |
|---|---|---|---|---|
| 4,324,314 A * | 4/1982 | Beach | B25F 5/00 | |
| | | | 181/258 | |
| 4,530,418 A * | 7/1985 | Currie | F01N 3/2885 | |
| | | | 181/227 | |
| 5,815,277 A * | 9/1998 | Zare | G01J 3/10 | |
| | | | 356/440 | |
| 2011/0127107 A1 | 6/2011 | Tanase et al. | | |
| 2012/0206011 A1 * | 8/2012 | Longoni | F16L 55/02718 | |
| | | | 310/300 | |
| 2023/0260497 A1 * | 8/2023 | Taira | G10K 11/172 | |
| | | | 181/284 | |

FOREIGN PATENT DOCUMENTS

| | | | |
|---|---|---|---|
| WO | 12169 | A1 | 8/2012 |
| WO | 2017137455 | A1 | 8/2017 |
| WO | 2017170337 | A1 | 10/2017 |
| WO | 2020125799 | A1 | 6/2020 |

* cited by examiner

ULTRA-LOW FREQUENCY ACOUSTIC ABSORBER

CROSS-REFERENCE TO RELATED APPLICATION

This application claims the benefit of U.S. Provisional Patent Application No. 63/178,548, filed on Apr. 23, 2021.

TECHNICAL FIELD

The disclosure of the present patent application relates to sound absorption and attenuation, and particularly to an acoustic absorber for absorbing and attenuating sound in the ultra-low frequency range, where the acoustic absorber is positioned for optimal acoustic absorption based on the acoustic soft boundary condition (ASBC).

BACKGROUND ART

For acoustic absorption by a particular sample of material, based on the causal nature of the material response to an incident acoustic wave, a minimum sample thickness $d_{min}$ can be derived for a given absorption spectrum $A(\lambda)$ as a function of wavelength $\lambda$. For acoustic waves traveling in the air, the causal constraint dictates that the sample thickness d must satisfy the following relation:

$$d \geq \frac{1}{4\pi^2} \cdot \frac{B_{eff}}{B_0} \left| \int_0^\infty \ln[1 - A(\lambda)]d\lambda \right| = d_{min}, \quad (1)$$

where $B_0$ is the atmospheric pressure and $B_{eff}$ is the effective bulk modulus of the sample at the static limit. From equation (1), it can be seen that the absorption of low frequency sound would require a sample thickness that is comparable to, or greater than, a quarter of a wavelength, with an even larger thickness for near-total absorption.

Implicit in the derivation of equation (1) are two conditions: the macroscopic lateral uniformity of the sample, and the hard reflecting boundary backing. However, by breaking these two implicit assumptions, near-total absorption of airborne sound can be attained with ultra-thin sample thicknesses for low frequencies. Such absorbers, however, lose their advantage at higher frequencies, thus their applications can be regarded as complementary to broadband metamaterial absorbers demonstrating excellent absorption performance starting at 350 Hz and up. It would be desirable to be able to design an acoustic absorber which takes advantage of breaking these conditions, thus providing acoustic absorption in the ultra-low frequency range with a much lower thickness than that dictated by equation (1).

The acoustic soft boundary condition (ASBC) is an alternative boundary condition to the acoustic hard boundary condition (AHBC), the latter of which is prevalent for airborne sound. The ideal ASBC can be uniquely characterized by a node in pressure modulation p and an anti-node in the displacement velocity u, while its surface impedance is defined as Z=p/u=0. The velocity anti-node on the ASBC creates a high displacement velocity zone at the boundary surface for a porous absorber, leading to high absorption from the high relative displacement velocity between air and the solid skeleton. This effect is especially significant in the low frequency regime since the displacement velocity decays slowly away from the boundary. In contrast, an absorber placed on the AHBC cannot exhibit any significant absorption until its thickness exceeds one quarter of a wavelength. It would be desirable to be able to take advantage of the soft boundary condition rather than the hard boundary condition in order to provide acoustic absorption in the ultra-low frequency range with the low thickness considerations discussed above. Thus, an ultra-low frequency acoustic absorber solving the aforementioned problems is desired.

DISCLOSURE

The ultra-low frequency acoustic absorber includes a hollow housing having opposed first and second open ends, and a plurality of metallic mesh layers stacked within the housing. As a non-limiting example, each of the metallic mesh layers may have an average pore size of approximately $4 \times 10^{-4}$ mm$^2$. As a further non-limiting example, the hollow housing may be cylindrical, and each of the metallic mesh layers may have a circular shape. As an additional non-limiting example, each of the metallic mesh layers has a thickness of approximately 0.2 mm, and 25 such metallic mesh layers may be stacked within the hollow housing.

In order to secure the plurality of metallic mesh layers within the hollow housing, first and second mesh covers or the like may cover the first and second open ends of the hollow housing, respectively. Each of the first and second mesh covers has an average mesh opening size and rigidity greater than the average pore size and rigidity of each of the metallic mesh layers.

Further, at least one spacer may be provided to form a gap between the housing and a support surface, such as a hard wall or the like. A first end of the at least one spacer is secured to the second open end of the hollow housing, and a second end of the at least one spacer is adapted for mounting on the support surface. The at least one spacer may have a length sufficient to space the ultra-low frequency acoustic absorber at a position of optimal absorption based on the acoustic soft boundary condition (ASBC). As a non-limiting example, the at least one spacer may have a length of between approximately 0.5 cm and approximately 1.5 cm.

In an alternative embodiment, a hybrid membrane resonator (HMR) includes a housing having an open end and an opposed closed end, and a decorated membrane resonator covering and sealing the open end of the housing. The decorated membrane resonator may be formed from an elastic membrane with a platelet centrally secured thereto. A cavity is defined within the housing, between the decorated membrane resonator and the closed end of the housing, with the closed end of the housing defining a reflecting back plate. At least one hole may be formed through a sidewall of the housing, where the at least one hole is configured to create an acoustic soft boundary condition within the cavity and behind the decorated membrane resonator. The at least one hole may be sized and/or positioned relative to the housing to create the acoustic soft boundary condition. As a non-limiting example, three holes may be formed through the sidewall of the housing, angularly separated from one another by 120° around a circumference of the sidewall of the housing. Each of the holes may form a cylindrical passage formed through the sidewall.

In another alternative embodiment, an alternative hybrid membrane resonator (HMR) may include a housing having an open end and an opposed closed end, also with a decorated membrane resonator (DMR) covering and sealing the open end of the housing. A cavity is defined within the housing, between the decorated membrane resonator and the closed end of the housing. The closed end of the housing defines a reflecting back plate. The HMR further includes a Fabry-Pérot resonator mounted to an outer face of the closed end of the housing. A channel is formed through the closed end of the housing such that the cavity communicates with an interior of the Fabry-Pérot resonator. The Fabry-Pérot resonator is not limited to any single configuration. As a non-limiting example, the Fabry-Pérot resonator may have a folded, substantially spiral configuration.

These and other features of the present subject matter will become readily apparent upon further review of the following specification.

BRIEF DESCRIPTION OF THE DRAWINGS

Similar reference characters denote corresponding features consistently throughout the attached drawings.

BEST MODE(S)

Figure 1:
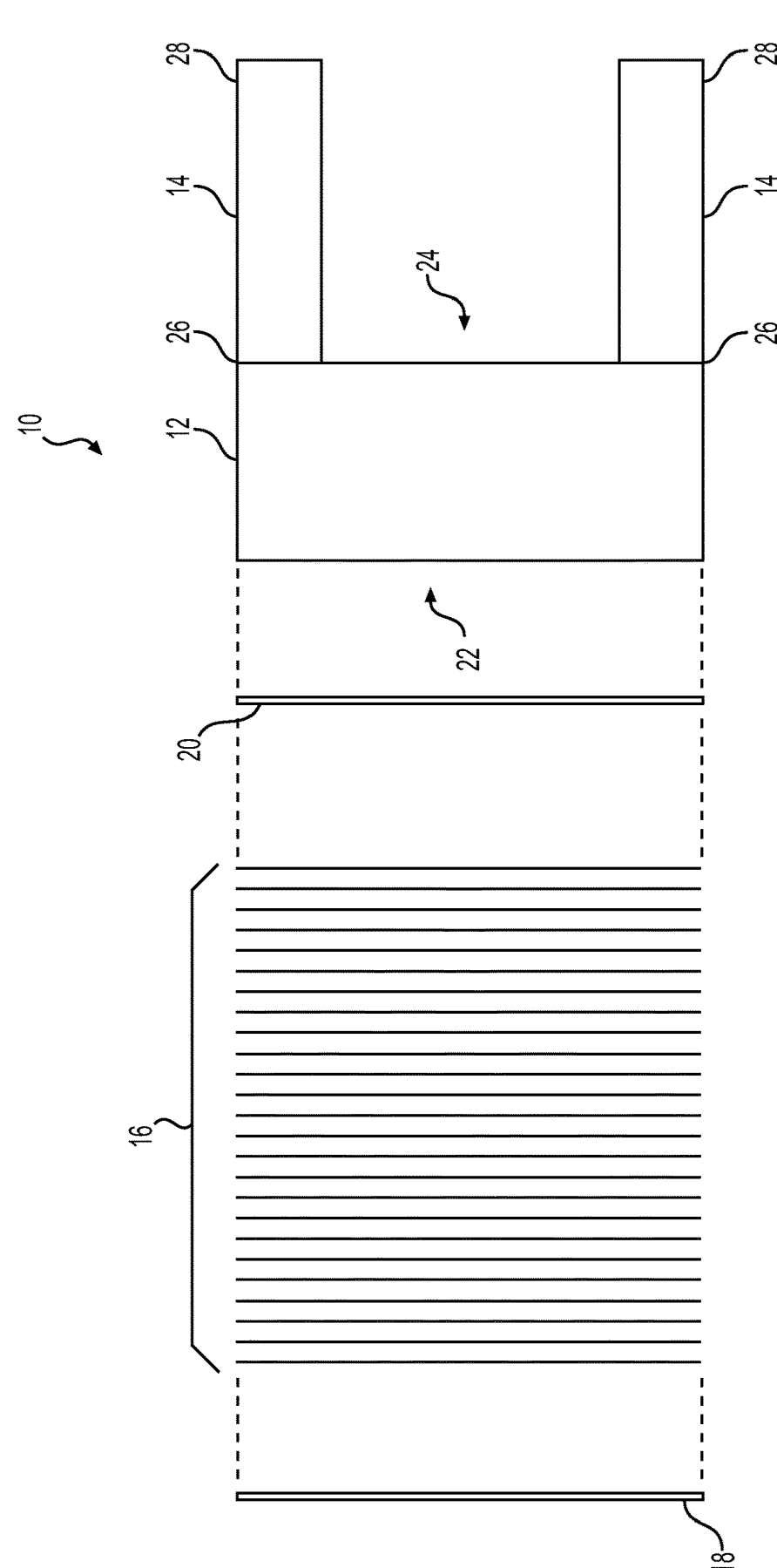
FIG. 1 is an exploded side view of an ultra-low frequency acoustic absorber.
Figure 2:
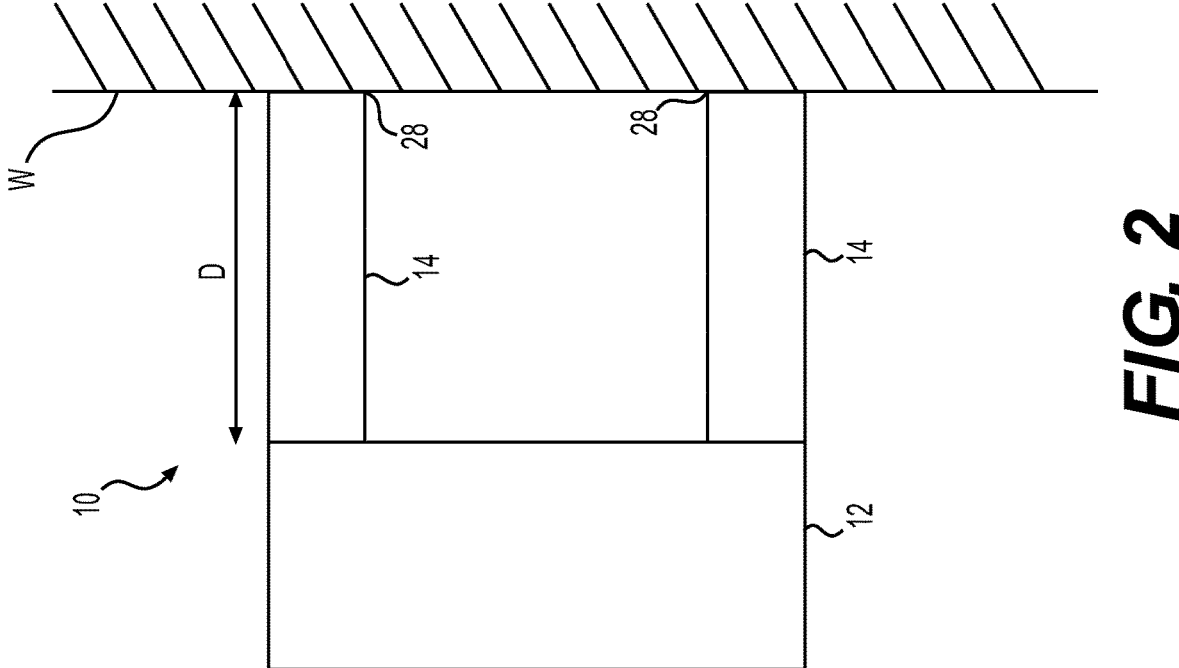
FIG. 2 is a side view of the ultra-low frequency acoustic absorber mounted on a hard reflecting support surface.

Referring now to FIGS. 1 and 2, the ultra-low frequency acoustic absorber 10 includes a hollow housing 12 having opposed first and second open ends 22, 24, respectively, and a plurality of metallic mesh layers 16 stacked within the housing 12. As a non-limiting example, each of the metallic mesh layers 16 may have an average pore size of approximately $4 \times 10^{-4}$ mm$^2$. As a non-limiting example, the hollow housing 12 may be cylindrical, and each of the metallic mesh layers 16 may have a circular shape. As a further non-limiting example, each of the metallic mesh layers 16 has a thickness of approximately 0.2 mm, and 25 such metallic mesh layers 16 may be stacked within the hollow housing.

In order to secure the plurality of metallic mesh layers 16 within the hollow housing 12, first and second mesh covers 18, 20, respectively, or the like may cover the first and second open ends 22, 24 of the hollow housing 12, respectively. Each of the first and second mesh covers 18, 20 has an average mesh opening size and rigidity greater than the average pore size and rigidity of each of the metallic mesh layers 16.

Further, at least one spacer 14 may be provided to form a gap between the housing 12 and a support surface, such as a hard wall W or the like. In FIGS. 1 and 2, two such spacers 14 are shown for exemplary purposes, however, it should be understood that any suitable number of spacers may be used. A first end 26 of the at least one spacer 14 is secured to the second open end 24 of the hollow housing 12, and a second end 28 of the at least one spacer 14 is adapted for mounting on the support surface W. As will be discussed in greater detail below, the at least one spacer 14 has a length sufficient to position the acoustic absorber at a location of optimal acoustic absorption based on the acoustic soft boundary condition. As a non-limiting example, the at least one spacer may have a length D of between approximately 0.5 cm and approximately 1.5 cm.

Preferably, each metallic mesh layer has a high thermal conductivity which, combined with the small pore size, maximizes the frictional absorption in the viscous boundary layer, thus providing excellent absorption efficiency per unit thickness. As will be described in detail below, the complex effective bulk modulus $\upsilon_{eff}$ and density $\rho_{eff}$ are extracted from experimental reflection data under different terminal boundary conditions. These effective material parameters allow for the simulations described below.

Figure 3A:
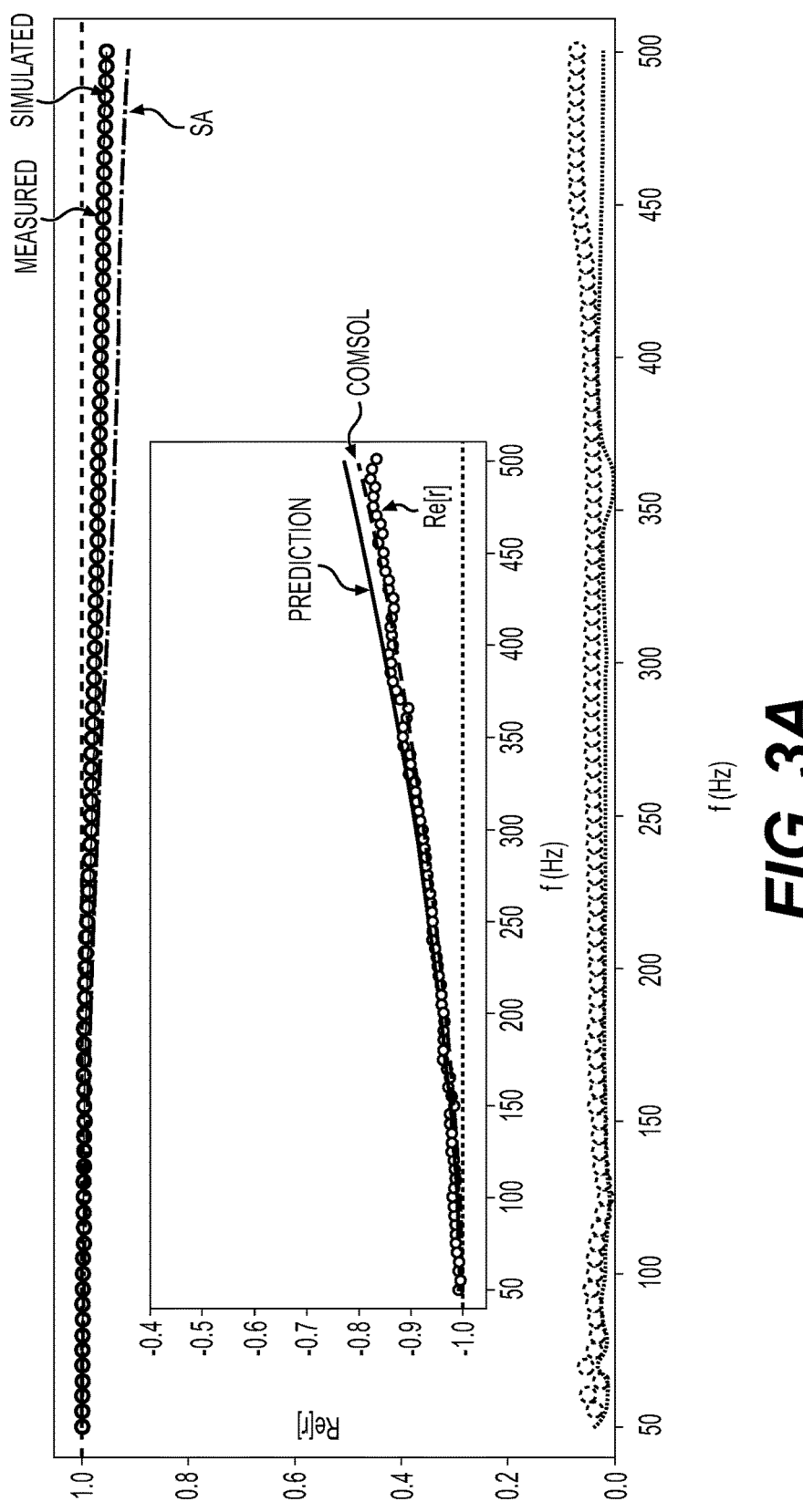
FIG. 3A is a graph comparing measured and simulated values of absorption/extinction for an open boundary condition without an acoustic absorber, with the inset comparing predicted, simulated and measured values of Re[r] for the same configuration.
Figure 3B:
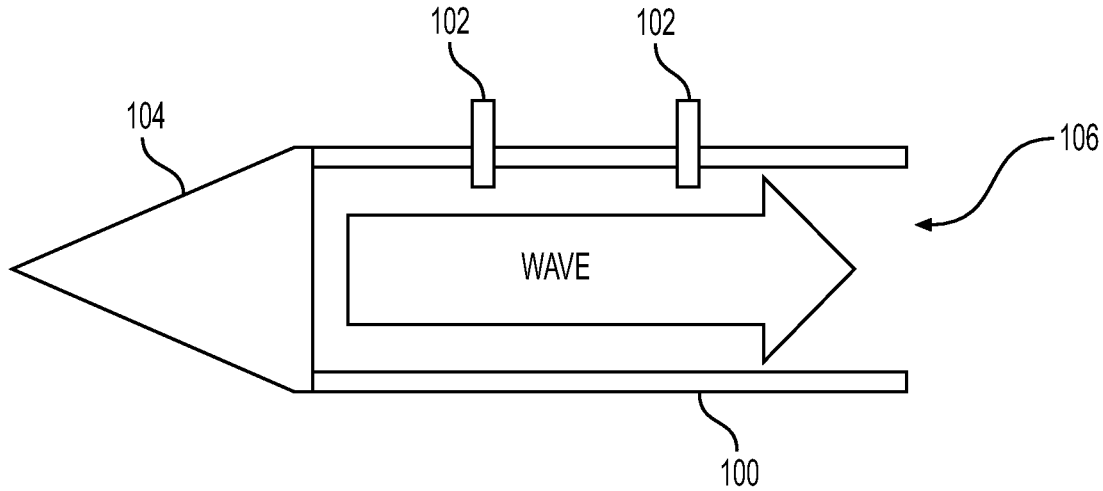
FIG. 3B diagrammatically illustrates an experimental setup for the open boundary condition of FIG. 3A.

As illustrated in FIG. 3B, the acoustic soft boundary condition (ASBC) in the low frequency regime can be realized experimentally by directly opening one end of an impedance tube 100. In the experimental setup of FIG. 3B, speaker 104 covers one end of the impedance tube 100, with the other end 106 forming an open boundary. Microphones 102 are embedded within the wall of impedance tube 100. as illustrated schematically in the inset of FIG. 1b. Due to scattering, the actual impedance of an open tube is given by:

$$\frac{Z_{open}}{Z_0} = 0.25(kr)^2 + ik\delta_0, \tag{2}$$

where r=5 cm is the radius of the impedance tube 100, k is the wave number, $Z_0=\rho_0 c_0$ is the impedance of air, $\rho_0$ and $c_0$ are the density and sound speed of air, respectively, and 80$_0$=0.6133r is the analytically determined coefficient for the unflanged opening condition. The inset in FIG. 3A shows the measured real part of reflection coefficient, Re[r], with the open tube condition, which demonstrates excellent agreement with the prediction obtained from equation (2) and full wave simulations carried out by COMSOL Multiphysics® software. Details of the full wave COMSOL simulations are given below. A slight discrepancy between the theoretical calculation and the full waveform COMSOL simulation at higher frequencies can be attributed to the fact that in the theoretical calculation using equation (2), a one-dimensional (1D) plane wave was assumed throughout, but in full waveform simulations the scattered waves are not necessarily in the theoretically assumed form.

The Re[r] plotted in the inset of FIG. 3A, with no absorption sample, shows that the ideal ASBC at the open boundary with a zero impedance value can only be realized in the limit of vanishing frequency. At 50 Hz, Re[r] is found to be extremely close to −1, which suggests that the open boundary in this case can be treated as close to being an ideal ASBC. With increasing frequency, however, Re[r] is seen to deviate from −1, implying an increasing amount of scattering transmission through the opening. Thus, for the ASBC, there is a need to define a quantity known as "extinction", which is given by:

$$extinction = 1 - |reflection|^2 = absorption + |transmision|^2. \quad (3)$$

Quantitatively, one can monitor the deviation of ASBC from its ideal value by using Re[r]. Whenever Re[r] lies between −1 and 0, there can be some absorption enhancement effect. When Re[r] crosses zero into the positive territory, the boundary condition shifts from a partial soft to a partial hard boundary condition.

In the main portion of FIG. 3A, the extinction performance of a 5 mm thick sample, made of 25 layers of metallic mesh, placed in front of the tube's open end 106 is studied. In this case, an accurate measurement of the absorption would need data on scattered transmission, which would require sensing sound amplitude in an anechoic chamber along a spherical surface surrounding the tube 100. Instead of such measurements, here a full-waveform simulation is used with a large spherical boundary surrounding the impedance tube 100 to obtain the absorption value. This is discussed in detail below.

From the sample's complex values of $\kappa_{eff}$ (f) and density $\rho_{eff}$(f) already obtained from the impedance tube's reflection and transmission measurements, the extinction E can be predicted as a function of frequency by using the COMSOL full wave simulation, shown in the main portion of FIG. 3A as a solid line. The simulated prediction is seen to agree very well with the measured results, shown by the open circles. By using the same material parameter values, the simulated absorption can be obtained (indicated in FIG. 3A as "SA"). It can be seen that these data plots all merge below ~200 Hz. This is not surprising, since almost total reflection is expected below this frequency so that the scattered transmission is negligible. In the same main portion of FIG. 3A, shown on the bottom of the plot, the absorption of the same 5 mm sample placed in front of a hard reflecting boundary can be seen. Almost no absorption can be seen for such a thin sample.

The absorption spectrum of the 5 mm sample, placed in front of a near-ideal ASBC, is extraordinary when comparing this sample thickness with the minimum sample thickness predicted by equation (1) by using the absorption spectrum ("SA" in FIG. 3A) and taking $B_{eff}=B_0$, then $d_{min}$ is calculated to be approximately ~80 cm, which is 160 times larger than the sample thickness. It should be emphasized that better absorption is expected for frequencies below 50 Hz, thus the advantage is even larger. The lower cutoff of 50 Hz is due to the measurement limitation of the impedance tube. Rather than repudiating the causality constraint, which implicitly assumes a hard boundary substrate, the purpose of this comparison is to show the huge advantage of complementarity offered by the ASBC.

Figure 4:
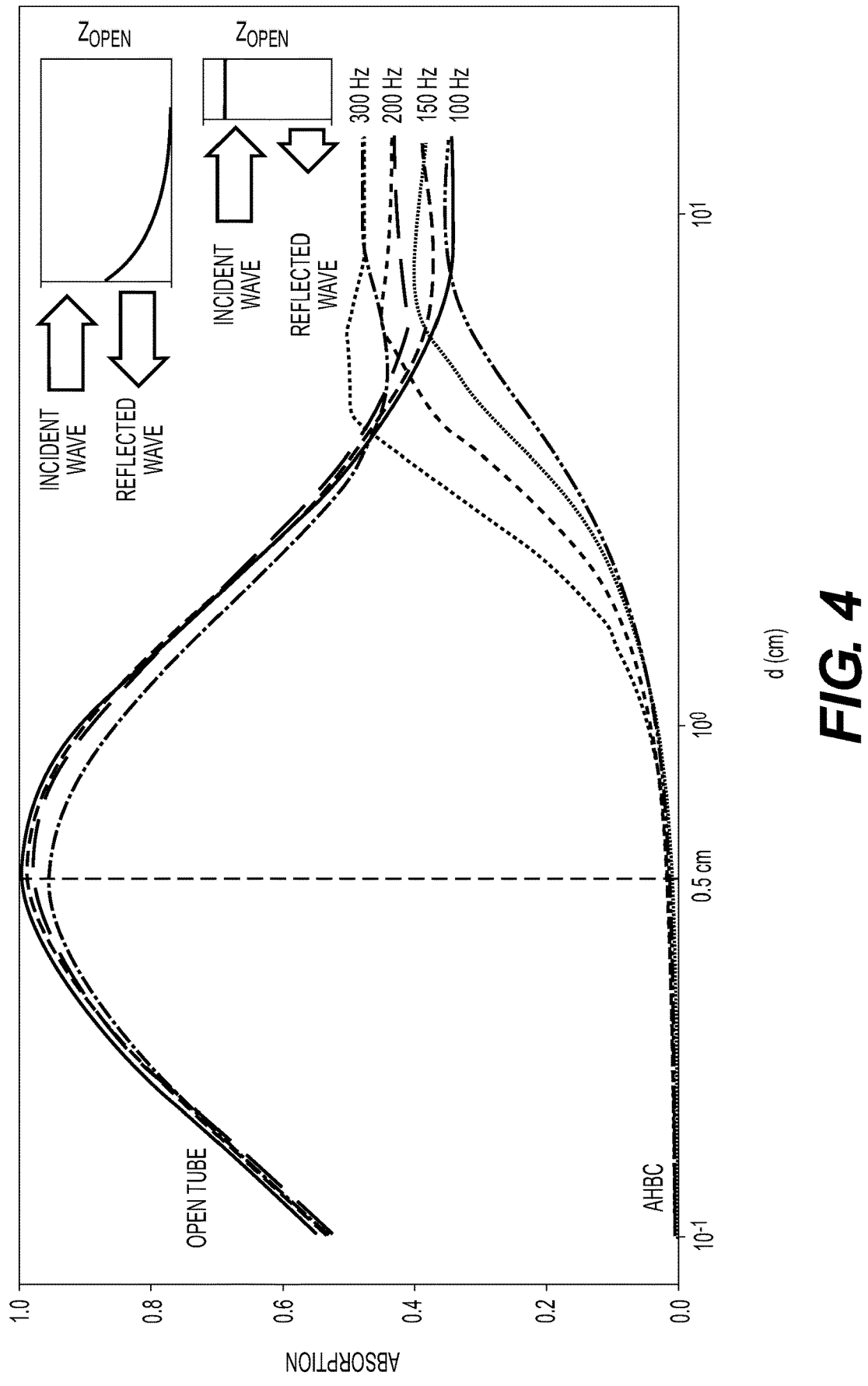
FIG. 4 is a graph comparing acoustic absorption as a function of absorber thickness in logarithmic scale between an acoustic absorber backed by an acoustic soft boundary condition (ASBC) and an acoustic hard boundary condition (AHBC), with the inset illustrating a simulated displacement velocity amplitude distribution for a sound wave traveling through a thick absorber (top) and a thin absorber (bottom), each backed by an ASBC.

There is an optimal sample thickness for absorbers placed in front of an ASBC. FIG. 4 illustrates the simulated absorption as a function of sample thickness d, plotted in logarithmic scale, at different frequencies. Solid and dashed lines represent the absorption provided by samples with open and hard boundary backing, respectively. The peaks of the solid lines indicates that the optimal thickness of the sample, for frequencies between 100 Hz to 300 Hz, is 0.5 cm. Deviation from the optimal thickness would result in a worse absorption spectrum. The peaks in FIG. 4 are the result of two competing factors: accessibility to the ASBC at the backside of the sample, and the absorption capability provided by the sample itself.

Considering a wave that travels through an extremely thick absorber with ASBC backing, as shown in the inset of FIG. 4 (on the right), the wave amplitude decays exponentially to 0 before it can reach the ASBC backing. This implies that the wave cannot access to the advantage offered by the ASBC. As a result, a thick absorber backed by either ASBC or AHBC would have the same absorption performance. This can be seen by realizing that the solid and dashed lines at the same frequencies join together as the sample thickness increases. On the other hand, the other inset in FIG. 4 (on the bottom of the inset) shows another extreme case, where a wave travels through a very thin absorber. Although the wave can easily reach the ASBC backing, the absorber is too thin to provide sufficient material to dissipate the incident wave. From the above, it is clear that starting from zero thickness, the absorption must increase, but when the sample is somewhat thick, the absorption would decrease as thickness increases because of the decreased accessibility to the absorption advantage offered by ASBC. It follows that there must be an optimal in-between sample thickness for maximum absorption. In the present case, this optimal thickness has been found to occur at ~5 mm.

Figures 5A, 5B:
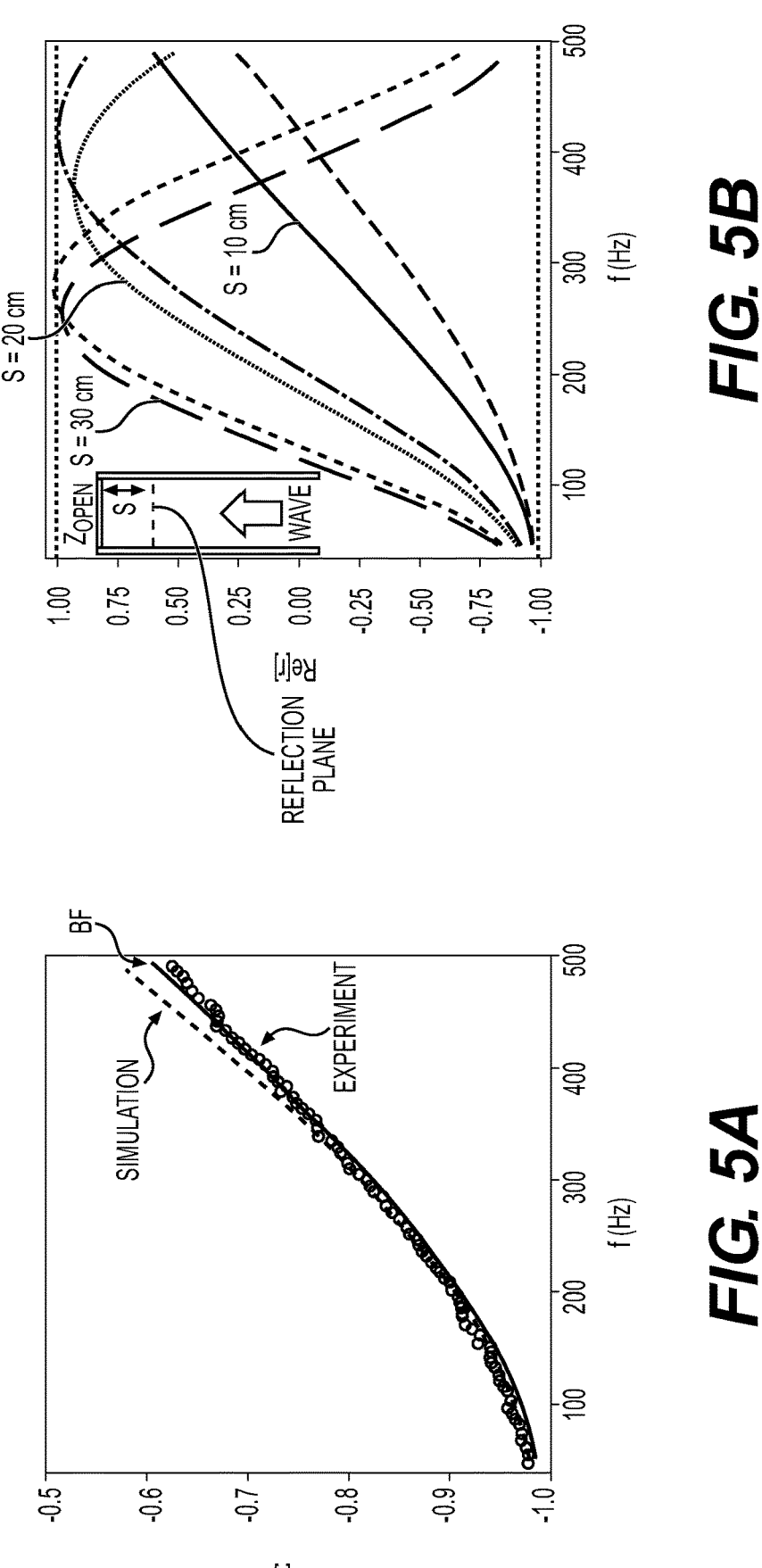
FIG. 5A is a graph comparing experimental, simulated and best fitted (BF) Re[r] values for a configuration where an AHBC is spaced apart from the open boundary of an impedance tube to form a gap therebetween.
FIG. 5B is a graph comparing different Re[r] values for an open boundary configuration, where an internal reflection plane is spaced at differing distances from the open boundary.

Although the open tube condition provides an excellent soft boundary condition in the low frequency regime, it is impractical for actual applications, given that a hard boundary backing is almost always required. Thus, the ASBC may be placed at 90° to the incident wave direction; i.e., by using an open gap 106, as shown in the experimental apparatus of FIG. 5D, where the apparatus of FIG. 3B has been modified by the addition of the acoustic hard boundary condition (AHBC). FIG. 5A shows the Re[r] obtained from simulation and experiment when an AHBC is placed 1.5 cm away from the tube opening (corresponding to the setup of FIG. 5D). By using the same form of equation (2), the surface impedance of the gap opening on the side can be fitted by $Z_{gap}/Z_0$=0.4 $(kr)^2+ik(0.9)$. The best fitted Re[r] from this form of $Z_{gap}$ is plotted as the solid line in FIG. 5A (labeled "BF").

The gap ASBC induces an additional phase factor at the backside of the sample, which can affect the effective boundary condition, due to the additional travel distance (from the backside of the sample) needed to reach the gap opening on the side. In order to investigate this effect, the simple geometry shown in the inset of FIG. 5B is used, where the backside of the sample is at a distance S from the tube opening, for full wave from simulations. The additional phase at the backside of the sample is referred to as the geometric phase (GP). In FIG. 5B, S is varied and plotted, with solid lines representing the corresponding full wave form simulated Re[r] as a function of frequency. In FIG. 5B, the dashed lines represent the corresponding Re[r], with the GP defined as cos [k(2S)+π], where the π comes from the effect of the ASBC. Comparing the solid and dashed lines with the same S, it is clear that the GP is the major factor that controls the frequency range that exhibits negative Re[r]; i.e., the partial ASBC regime. In actual applications, GP is mostly associated with the lateral size of the sample; i.e., by using a gap ASBC, the lateral sample size should be small compared to the relevant wavelength range where good absorption performance is desired.

Figure 5C:
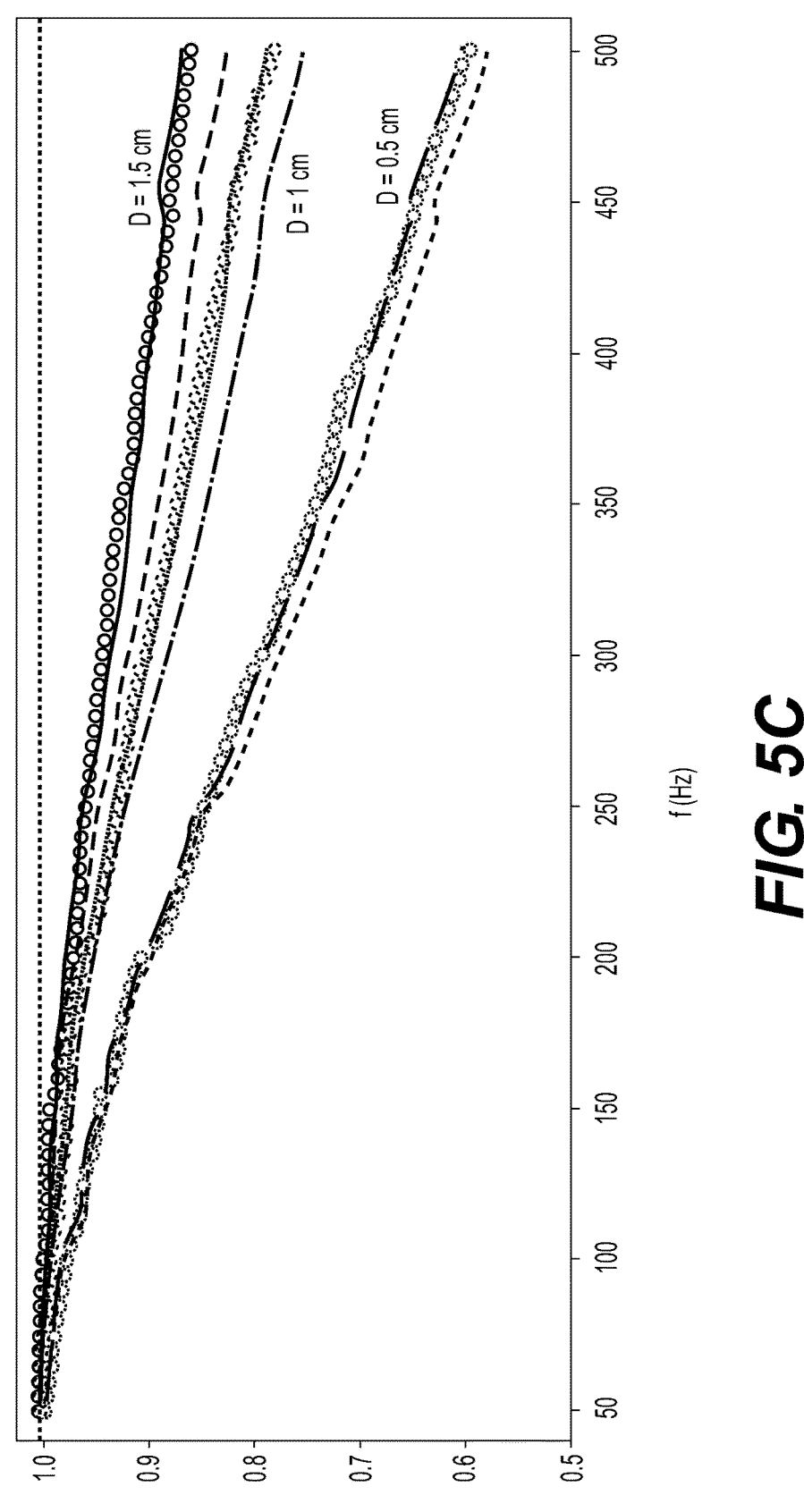
FIG. 5C is a graph comparing absorption/extinction for the configuration of FIG. 5A at different gap distances, but with the open boundary of the impedance tube covered by the ultra-low frequency acoustic absorber.
Figure 5D:
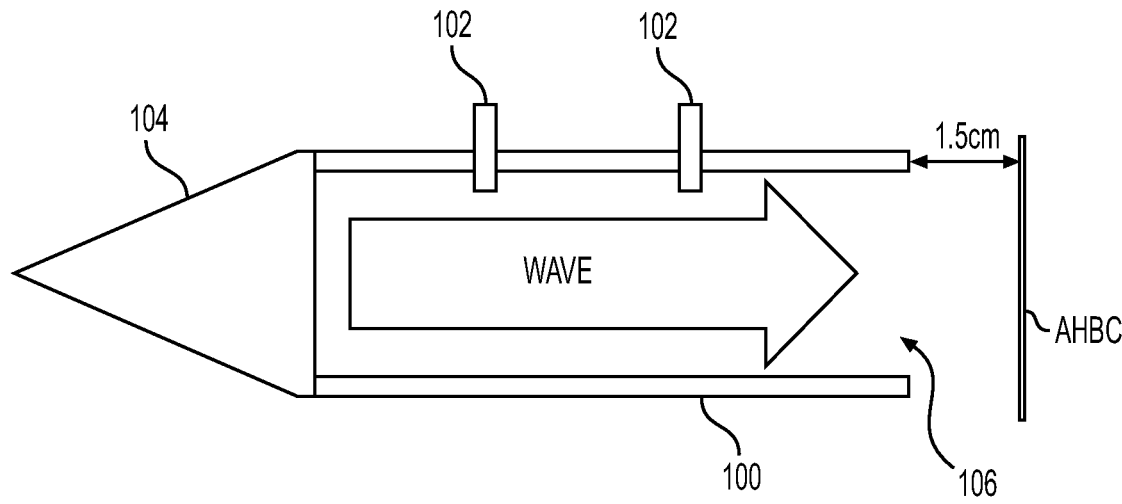
FIG. 5D diagrammatically illustrates the experimental setup of FIG. 5A.
Figure 5E:
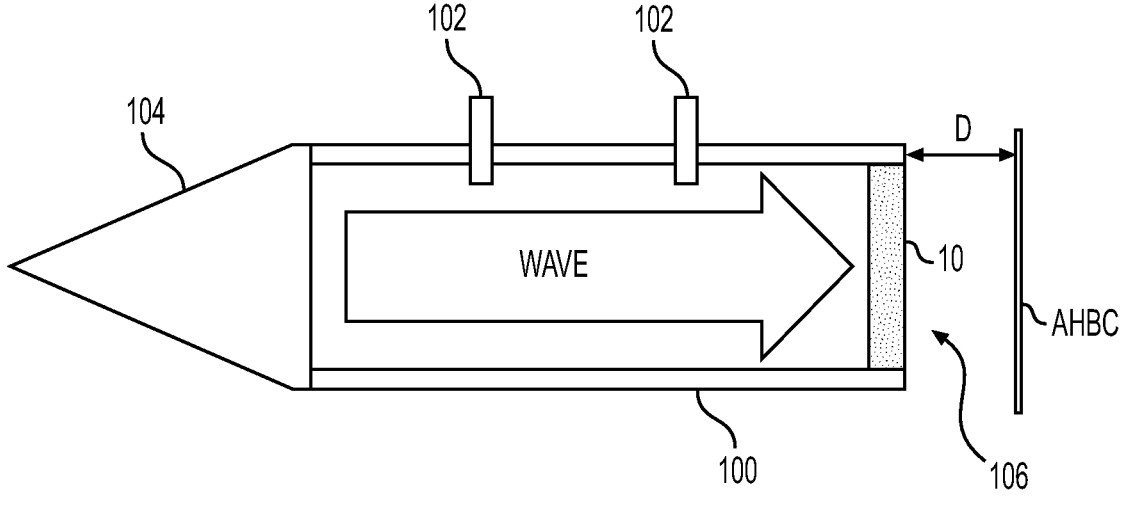
FIG. 5E diagrammatically illustrates the experimental setup of FIG. 5C.

In experiments, spacers (such as spacers 14) were constructed using three-dimensional (3D) printing to separate the absorber sample from the hard reflecting wall by a distance D. By placing a 0.5 cm thick metallic mesh sample 10 before the hard reflecting wall, as shown in the setup of FIG. 5E, the extinction with a gap size D =0.5 cm was measured, along with comparative gap sizes of 1 cm and 1.5 cm. The results are shown in FIG. 5C as the plotted circles. The experimental results agree very well with the corresponding results obtained from COMSOL simulations (shown as solid lines in FIG. 5C). The dashed lines in FIG. 5C denote the absorption provided by the same simulation. It is seen that for a gap size D of 1.5 cm, absorption is over 96% below 200 Hz, and is the dominant component in the extinction. Thus, by including the 1.5 cm gap as part of the sample thickness, the total thickness of the sample would be 2 cm, which is approximately 36.5 time smaller than $d_{min}$ suggested by equation (1).

The gap size D has a different effect from GP (or S). From symmetry of the wave propagation path, it is clear that in the middle of the circular cross-section, there must be a "stagnation point" where the backside of the sample directly feels the reflection from the hard wall. Thus, in the neighborhood of the central region, the velocity anti-node condition of the ASBC is mostly destroyed, and the absorption advantage is lost. When D decreases, this region increases in size for any given frequency, until D→0 and that region covers the whole backside of the sample, which is the AHBC. However, it should be noted that the effect of the gap size depends on the wave frequency as well. For low frequencies, such as close to 50 Hz, one can use a 0.5 cm gap size and the absorption can still reach ~99%. But for higher frequencies, the gap size should be adjusted to be larger in order to attain good absorption.

It can now be shown that the acoustic soft boundary can interact with the membrane resonators to enhance the absorption of ultra-low frequency acoustic waves (<100 Hz), with a sample thickness that is many times below the $d_{min}$ given by equation (1), where the soft boundary is not involved. It was previously shown that in a hybrid structure, made from a decorated membrane on a closed cavity of depth d, the required impedance of the membrane that can lead to zero reflection (and thus total absorption), is given by:

8

$$Z = Z_0(1 - i \cot kd).  \quad (4a)$$

Here, the bottom of the closed cavity is a hard reflecting wall. If the hard boundary condition at the bottom of the cavity is replaced by the soft boundary, then the condition for total absorption given in equation (4a) becomes:

$$Z = Z_0(1 + i \tan kd). \quad (4b)$$

Figure 6A:
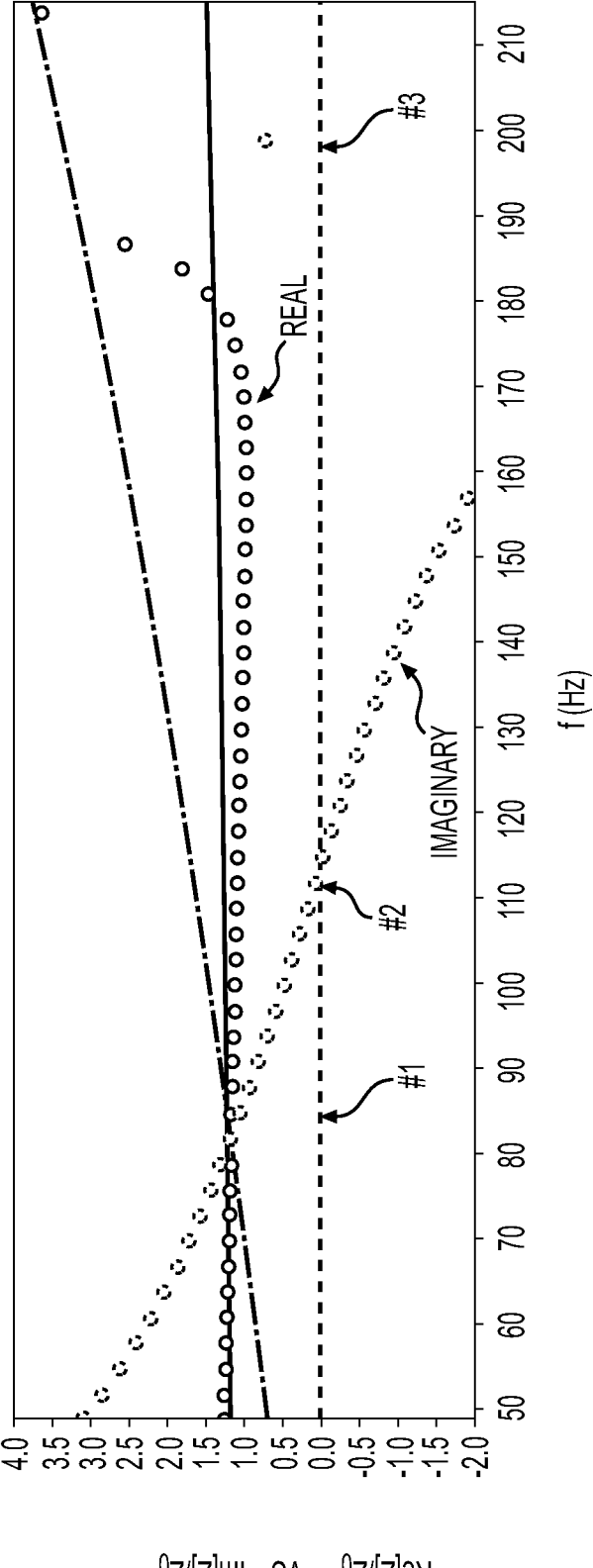
FIG. 6A is a plot comparing the real and imaginary parts of the impedance matching condition to those of a hybrid acoustic absorber.

It follows that in order to attain total absorption, the imaginary part of the membrane impedance can interpolate between negative infinity and positive infinity. This is reasonable because the imaginary part of the impedance is the inverse of the real part of the Green's function, and close to a resonance Ω, the inverse of the Green's function is simply proportional to $\Omega^2-\omega^2$. This means that for a partially open boundary, such as a cavity with sidewall holes, one can have the impedance-matching condition at a frequency lower than Ω, in contrast to the case of the hybrid resonance where the impedance matching has to occur at ω>2. To verify this, the normalized impedance-matching condition is plotted in FIG. 6A together with the normalized impedance of a membrane resonator. It can be seen that the required condition is reached at the intersection between the real and imaginary parts (indicated by arrow #1), which is far below the membranes first eigenmode (indicated by arrow #2) and the anti-resonance frequency (arrow #3). Details of the derivation of the condition can be found below.

Figure 6B:
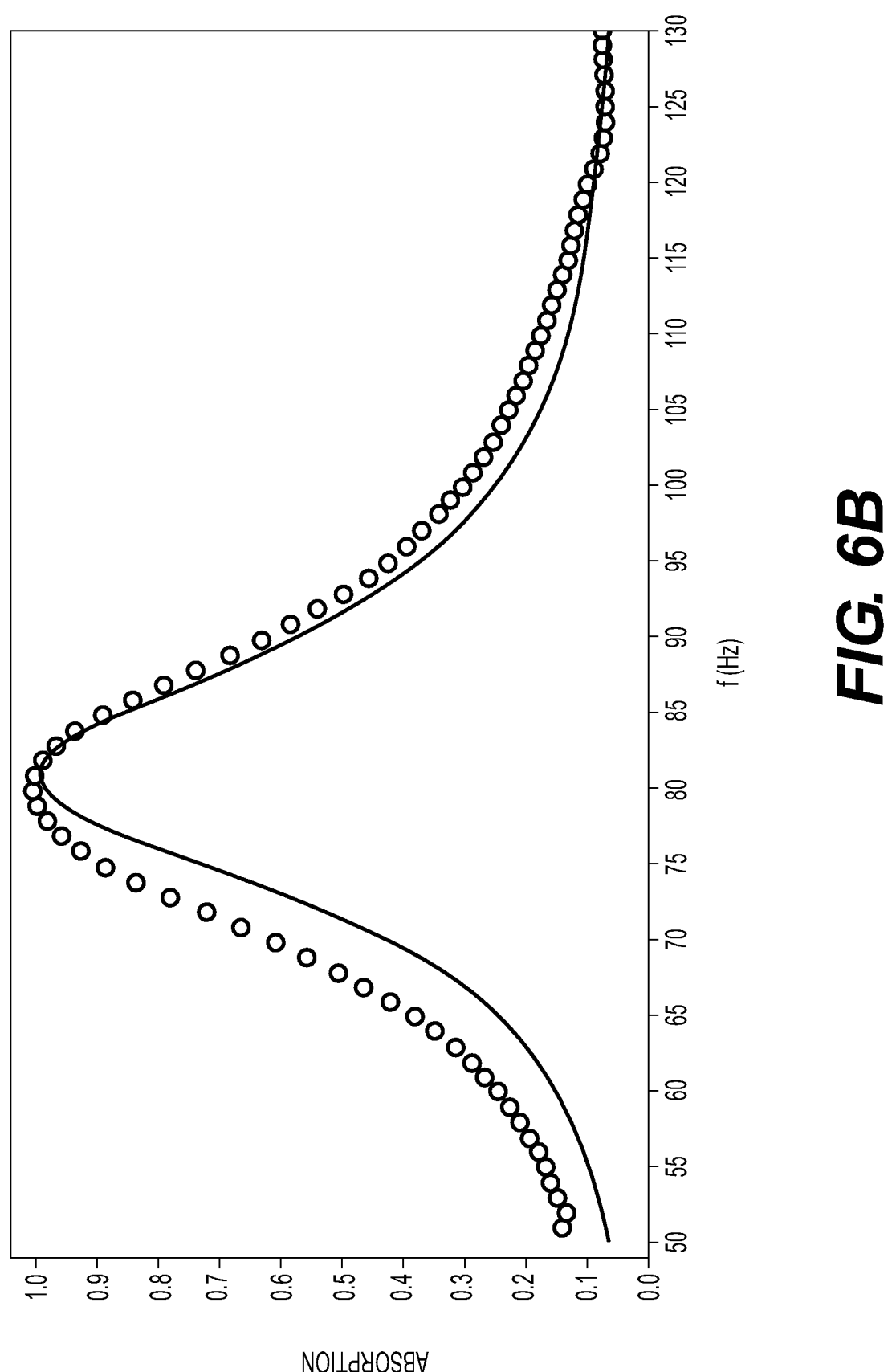
FIG. 6B is a graph comparing measured and simulated absorption for the hybrid acoustic absorber of FIG. 6A.
Figure 6C:
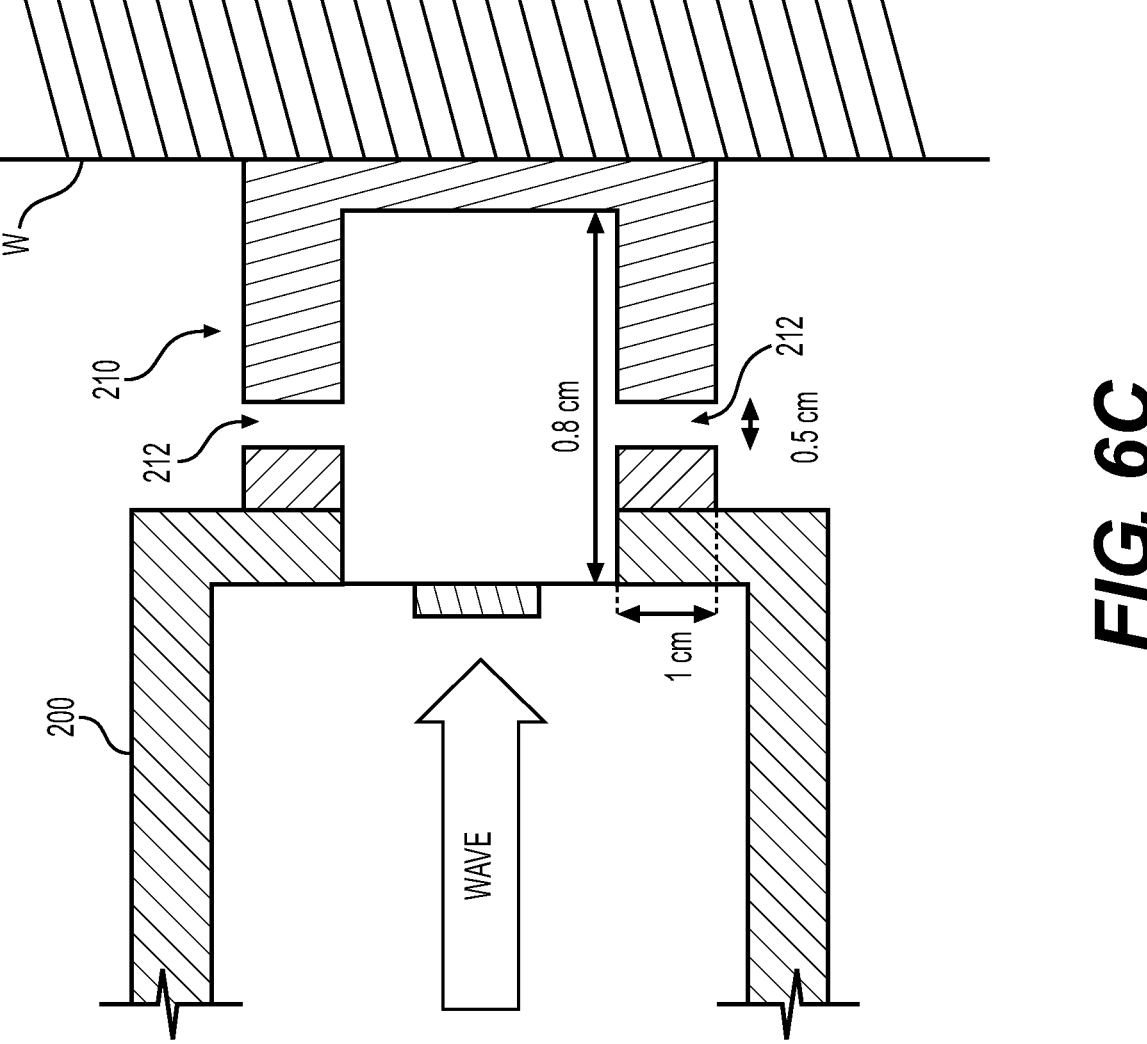
FIG. 6C diagrammatically illustrates the experimental setup of FIGS. 6A and 6B.

Further, it can be seen that the approximate matching of the real part of the impedance can also be extended to a rather broad frequency range. In FIG. 6B measured absorption (circles) and simulated absorption (solid line) are shown for a decorated membrane, whose first resonance is at 112 Hz, covering a cavity with three cylindrical sidewall holes (separated from each other by)120° with dimensions of 0.5 cm in diameter and 1 cm in height. FIG. 6C shows a schematic illustration of the hybrid structure 210 covering the opening of impedance tube 200, where the hybrid structure 210 has cylindrical sidewall holes 212 formed therethrough, as described above. It can be seen that the absorption can reach 99% at 81 Hz, with a full width half maximum (FWHM) of ~20-25 Hz, which is extremely broad for a low frequency absorption peak. If this measured absorption spectrum is substituted into equation (1), a $d_{min}$ of 10.2 cm is obtained, which is more than 12.5 times larger than the actual sample thickness of 0.8 cm.

In FIG. 6C, structure 210 is a hybrid membrane resonator (HMR) defined by a housing having a closed rear end (i.e., a hard reflecting end, which is positioned against wall W in FIG. 6C) and an opposed open end, which is covered by a decorated membrane resonator. The positioning and size of cylindrical sidewall holes 212 are selected to create an acoustic soft boundary condition within the cavity defined by the housing, behind the decorated membrane resonator. In FIG. 6C, although the cross-sectional view only illustrates two sidewall holes 212, it should be understood that this is for purposes of illustration only. As a non-limiting example, three such holes 212 may be formed through the sidewall of the housing, angularly separated from one another by 120° about the cylindrical sidewall.

Figures 6D, 6E, 6F:
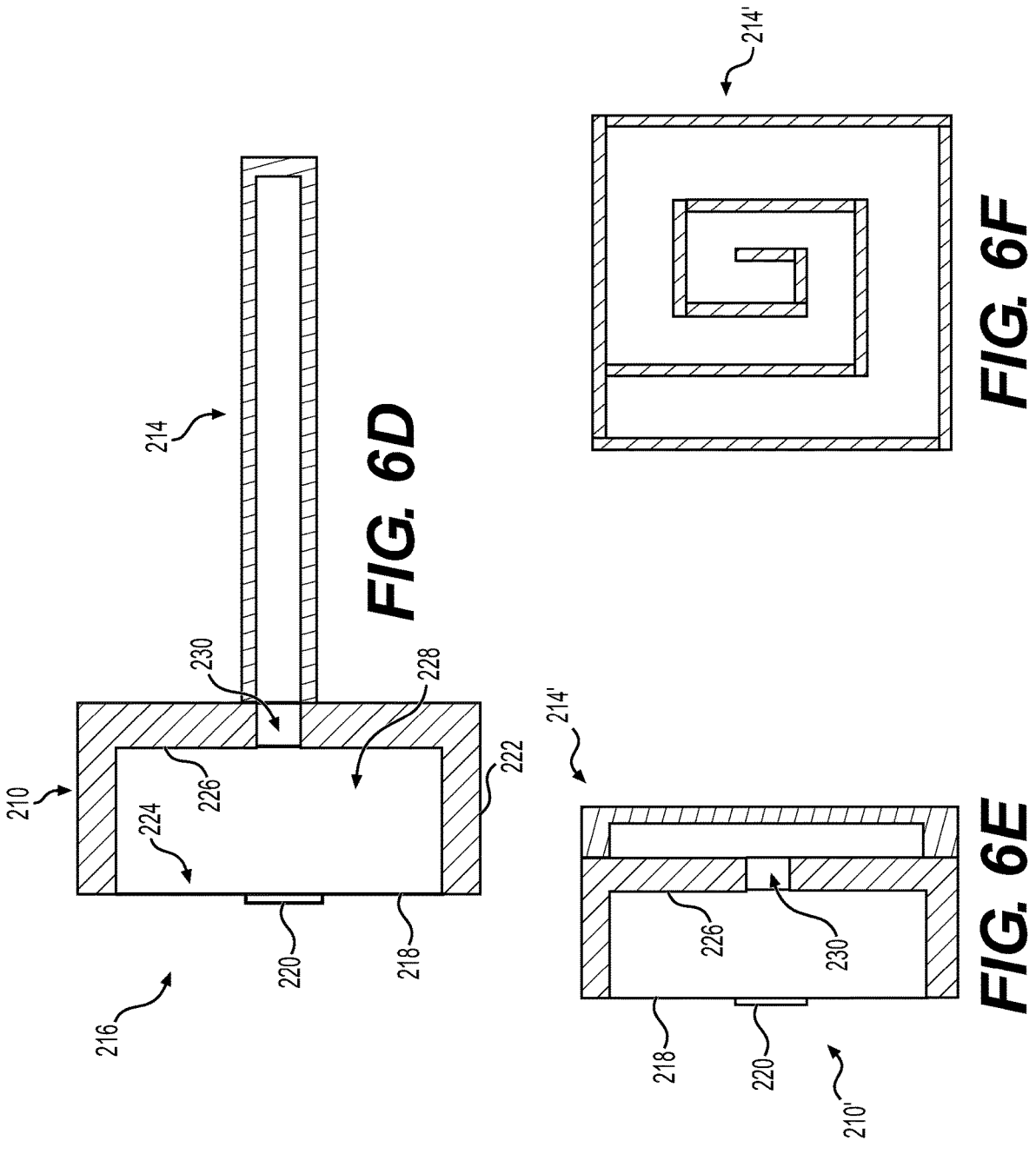
FIG. 6D is a diagrammatic illustration of an alternative embodiment of the hybrid acoustic absorber of FIGS. 6A, 6B and 6C.
FIG. 6E is a diagrammatic illustration of a further alternative embodiment of the hybrid acoustic absorber of FIG. 6D.
FIG. 6F is a top view of a Fabry-Pérot resonator of the hybrid acoustic absorber of FIG. 6E.
Figure 6G:
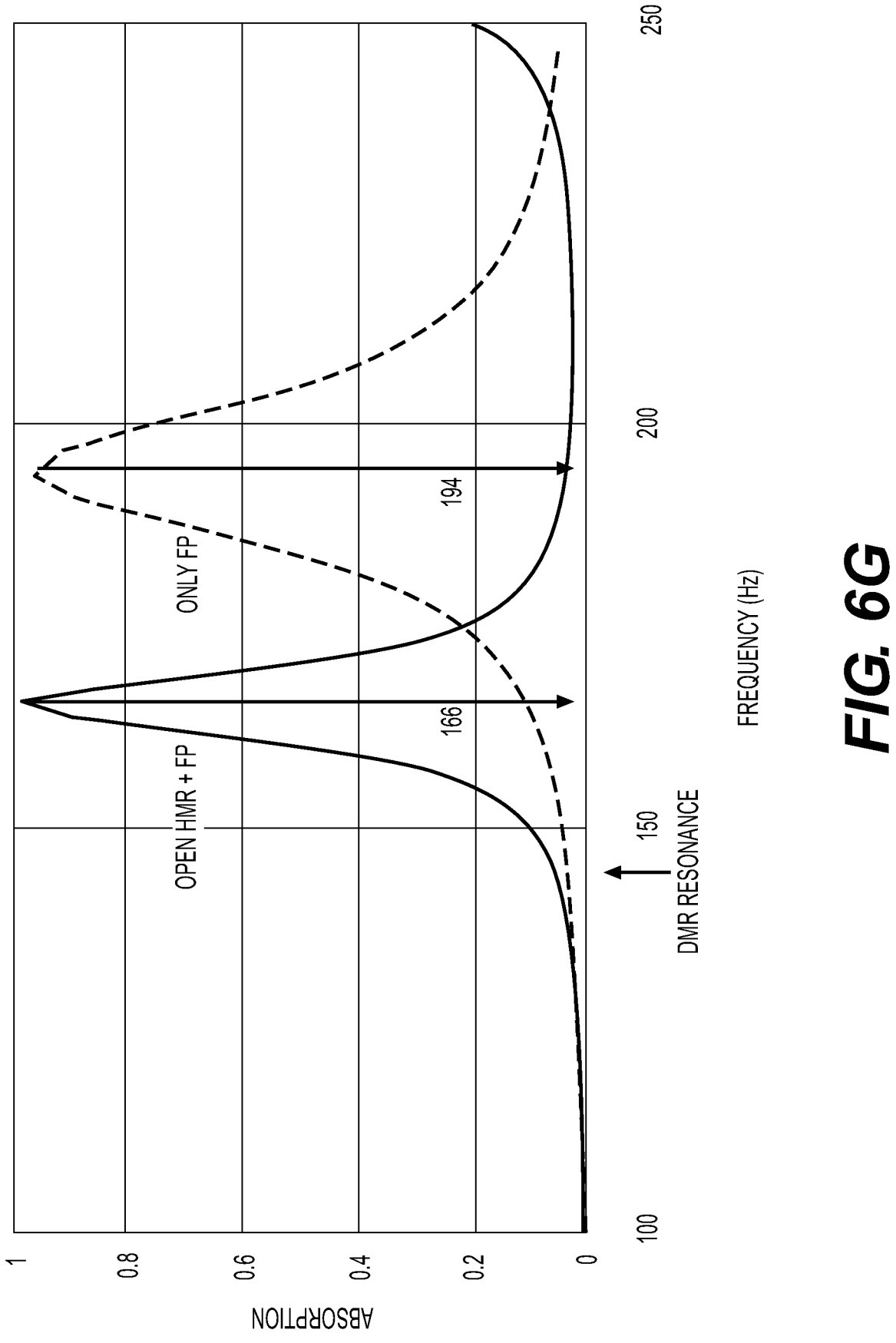
FIG. 6G is a graph comparing absorption of the hybrid acoustic absorber of FIGS. 6A-6C against that of a Fabry-Pérot resonator.

In the further alternative configuration of FIG. 6D, the hybrid membrane resonator (HMR) 210 is modified such that the cavity opens into a Fabry-Pérot (FP) resonator 214, rather than into open space. As is well known, a Fabry-Pérot (FP) is a tube with one open end and one closed end, where the resonance frequency is inversely proportional to the length of the FP resonator. By carefully tunning the dimension of the FP resonator, any surface impedance can be achieved at a single frequency, including impedance matching (i.e., total absorption). In the further alternative configuration of FIGS. 6E and 6F, HMR 210' is coupled to an alternative FP resonator 214' which is folded into a thin labyrinth pattern. As shown in FIG. 6G, is has been found that the combination of the HMR with the FP results in an absorption peak that is centered at a frequency in between the first resonance of the decorated membrane resonator (DMR) and the Fabry-Pérot resonance. By letting the membrane resonance frequency be lower than that of the Fabry-Pérot resonator, the required length of the Fabry-Pérot resonator can be greatly reduced. The absorption peak, can reach near-total absorption but does not break the causal limit.

The HMR 210 shown in FIG. 6D includes a decorated membrane resonator (DMR) 216 formed from a uniformly stretched elastic membrane 218 which is "decorated" by a platelet 220. As a non-limiting example, the elastic membrane 218 may have a radius of 45 mm and a thickness less than or equal to 0.2 mm. Corresponding to these exemplary dimensions, platelet 220 may be a thin, disc-shaped mass centrally secured to the elastic membrane 218, having a radius of 10 mm and a mass of 0.8 g. The boundary of elastic membrane 218 is fixed on a rigid frame, which is defined by housing 222. Housing 222 has an open end 224, which is covered by elastic membrane 218, and an opposing closed end 226 which defines a reflecting back plate.

In a conventional HMR, the closed end 226 seals the cavity 228, which is filled with gas, typically at atmospheric pressure. As a non-limiting example, the gas may be sulfur hexafluoride, typically chosen for its small adiabatic index. However, as discussed above, the HMR 210 of FIG. 6D has a central channel 230 which opens into the Fabry-Pérot (FP) resonator 214, which is secured to, and extends rearwardly from, the closed end 226.

For the above-described experiments with absorber 10, the sample was fabricated by sealing layers of metallic mesh in a 3D-printed cylindrical cage. The cage wall was 15 mm thick solid resin to ensure a negligible amount of leakage around the edge of the sample. The top and bottom faces of the cage were covered by two flat metallic mesh layers with a relatively large pore size and rigidity, so that the outer layers could press the stacked layers in a flat pancake geometry with minimal effect on the surface impedance. Connecting adapters to one side of the cage allowed for mounting on the terminal side of the impedance tube (Brüel & Kjær® Type 4206). To extract the effective material parameters of the sample, the sample was sandwiched between two segments of the impedance tube. Two sets of microphone slots with 35 cm and 10 cm separations were used in the measurements so that the measurable frequency could range from 49 Hz to 1540 Hz. Each set of two microphones was connected to two SR830 lock-in amplifiers such that the absolute pressure amplitude and phase could be detected. The transfer impedance method suggests that the surface impedance on the front side of the absorber is given by:

$$Z = Z_{eff} \frac{Z_b + iZ_{eff}\tan[k_{eff}d]}{Z_{eff} + iZ_b\,\tan[k_{eff}d]}, \quad (5)$$

where d is the sample thickness and $Z_b$ is the surface impedance of the impedance tube's backside boundary, so that reflection r can be calculated as $r=(Z-Z_0)/(Z+Z_0)$. Equating the calculated real and imaginary parts of r to the measured ones yields two equations with four unknowns, namely the real and imaginary part of $\kappa_{eff}$ and $\rho_{eff}$. Thus, two measurements with two different $Z_b$ were carried out in order to gain sufficient information to find all four unknowns. The $Z_b$ were simply chosen to be the $Z_{open}$ and $Z_{AHBC}$, which can be easily determined by independent experiments without the absorber.

Simulations were performed using COMSOL Multiphysics® software, using the "Acoustic Modulus" in the frequency domain. To complete a full waveform simulation, the experimental setup model was rebuilt in COMSOL. First, as sphere was constructed with a relatively large radius to imitate the open space in a laboratory. A perfect matching impedance condition was assigned to the surface of the sphere to ensure that there would be no backscattering. A 5 cm radius cylinder with a hard boundary condition was built at the center of the sphere to serve as the impedance tube. By propagating a plane wave along the cylindrical tube, the reflection and surface impedance of an unflanged open tube were able to be studied. Placing a 20 cm by 20 cm square hard boundary D cm away from the opening surface, the gap configuration was replicated. The transmission coefficient was determined by calculating the ratio between the energy flux radiating outward from the tube opening, and the input energy. By further assigning $\kappa_{eff}$ and $\rho_{eff}$ to a section of the circular tube with length t just in front of the open end, both the extinction and absorption coefficients could be easily obtained. The results of these full waveform simulations are presented in FIGS. 3A and 5C. However, the simulations shown in FIGS. 4 and 5B were carried out in a simplified manner, where $Z_{open}$ was assigned to the termination of the impedance tube. These simulations sacrificed the consideration of the transmission coefficient and the alteration of the plane wave form as the sound wave emerges from the open end. The tradeoff is much faster simulations with somewhat less accuracy. Such simulations are appropriate for those cases where the qualitative trend, rather than quantitative results, is the focus.

The impedance-matching condition can be derived using equation (5) with d equal to the cavity depth, $Z_{eff}=Z_0$ and $k_{eff}k_0$ for an arbitrary boundary with a surface impedance $Z_b=Z'$. It can be seen that equation (5) reduces back to $1-\cot(k_0d)$ and $1+i\tan(k_0d)$ if $Z'=\infty$ (hard boundary) and $Z'=0$ (soft boundary), respectively. By assuming $Z'=Z'_r+iZ'_i$, where $Z'_r$ and $Z'_i$ are both real numbers, and with d much smaller than the wavelength, the right hand side of equation (5) can be simplified as:

$$Z_0\left(1 + \frac{Z'_r Z_0\left(1+k^2d^2\right)}{\Delta}\right) + iZ_0\frac{Z'_i Z_0\left(1-k^2d^2\right) + kd\left(Z_0^2 - |Z'|^2\right)}{\Delta}, \quad (6)$$

where $\Delta=(Z'_r kd)^2(Z'_r kd)^2$. For a cavity with three holes that connect to the outer space, the impedance can be found by using a COMSOL simulation with "narrow region acoustic" assigned to the holes so that dissipation from the boundary layer effect is considered. It is found that the impedance of the cavity with three openings can be well fitted by $Z_0[(0.00010\omega+0.134)+i(0.00205\omega+0.054)]$. Plugging this expression for Z' into equation (6) yields the complex impedance-matching condition as a function of frequency that is plotted in FIG. 6A.

It is to be understood that the ultra-low frequency acoustic absorber is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. An ultra-low frequency acoustic absorber, comprising:
a hollow housing having opposed first and second open ends;
a plurality of metallic mesh layers stacked within the hollow housing, wherein the plurality of metallic mesh layers are stacked longitudinally; and
at least one spacer extending longitudinally and having longitudinally opposed first and second ends, the first end thereof being secured to the second open end of the hollow housing, and the second end thereof being adapted for mounting on an external support surface, such that the hollow housing is longitudinally spaced apart from the external support surface,
wherein the at least one spacer has a length sufficient to space the ultra-low frequency acoustic absorber at a position of optimal absorption based on an acoustic soft boundary condition.

2. The ultra-low frequency acoustic absorber as recited in claim 1, wherein the hollow housing is cylindrical.

3. The ultra-low frequency acoustic absorber as recited in claim 1, wherein each of the metallic mesh layers has an average pore size of approximately $4\times10^{-4}$ mm$^2$.

4. The ultra-low frequency acoustic absorber as recited in claim 3, wherein each of the metallic mesh layers has a thickness of approximately 0.2 mm.

5. The ultra-low frequency acoustic absorber as recited in claim 4, wherein the plurality of metallic mesh layers comprises 25 metallic mesh layers.

6. The ultra-low frequency acoustic absorber as recited in claim 1, further comprising:
a first mesh cover covering the first open end of the hollow housing; and
a second mesh cover covering the second open end of the hollow housing, wherein the plurality of metallic mesh layers are sandwiched between the first and second mesh covers, and wherein each of the first and second mesh covers has an average mesh opening size greater than the average pore size of each of the metallic mesh layers.

7. The ultra-low frequency acoustic absorber as recited in claim 1, wherein the at least one spacer has a length of between approximately 0.5 cm and approximately 1.5 cm.

8. An ultra-low frequency acoustic absorber, comprising:
a hollow housing having opposed first and second open ends;
a plurality of metallic mesh layers stacked longitudinally within the hollow housing, wherein each of the metallic mesh layers has an average pore size of approximately $4\times10^{-4}$ mm$^2$; and
at least one spacer extending longitudinally and having longitudinally opposed first and second ends, the first end thereof being secured to the second open end of the hollow housing, and the second end thereof being adapted for mounting on an external support surface, such that the hollow housing is longitudinally spaced apart from the external support surface.

9. The ultra-low frequency acoustic absorber as recited in claim 8, wherein the hollow housing is cylindrical.

10. The ultra-low frequency acoustic absorber as recited in claim 8, wherein each of the metallic mesh layers has a thickness of approximately 0.2 mm.

11. The ultra-low frequency acoustic absorber as recited in claim 8, wherein the plurality of metallic mesh layers comprises 25 metallic mesh layers.

12. The ultra-low frequency acoustic absorber as recited in claim 8, further comprising:
a first mesh cover covering the first open end of the hollow housing; and
a second mesh cover covering the second open end of the hollow housing, wherein the plurality of metallic mesh layers are sandwiched between the first and second mesh covers, and wherein each of the first and second mesh covers has an average mesh opening size and rigidity greater than the average pore size and rigidity, respectively, of each of the metallic mesh layers.

13. The ultra-low frequency acoustic absorber as recited in claim 8, wherein the at least one spacer has a length sufficient to space the ultra-low frequency acoustic absorber at a position of an acoustic soft boundary condition.

14. The ultra-low frequency acoustic absorber as recited in claim 13, wherein the at least one spacer has a length of between approximately 0.5 cm and approximately 1.5 cm.

15. A hybrid membrane resonator, comprising:
a housing having an open end and an opposed closed end; and
a decorated membrane resonator covering and sealing the open end of the housing, wherein a cavity is defined within the housing, between the decorated membrane resonator and the closed end of the housing, the closed end of the housing defining a reflecting back plate, and wherein the decorated membrane resonator comprises an elastic membrane and a platelet centrally secured to the elastic membrane,
wherein at least one hole is formed through a sidewall of the housing, the at least one hole being configured to create an acoustic soft boundary condition within the cavity and behind the decorated membrane resonator.

16. The hybrid membrane resonator as recited in claim 15, wherein the at least one hole comprises three holes.

17. The hybrid membrane resonator as recited in claim 16, wherein the three holes are angularly separated from one another by 120° around a circumference of the sidewall of the housing.

18. The hybrid membrane resonator as recited in claim 17, wherein each of the holes comprises a cylindrical passage formed through the sidewall.

19. The hybrid membrane resonator as recited in claim 15, wherein the at least one hole is sized and positioned relative to the housing to create the acoustic soft boundary condition.

20. A hybrid membrane resonator, comprising:
a housing having an open end and an opposed closed end;
a decorated membrane resonator covering and sealing the open end of the housing, wherein a cavity is defined within the housing, between the decorated membrane resonator and the closed end of the housing, the closed end of the housing defining a reflecting back plate, and wherein the decorated membrane resonator comprises an elastic membrane and a platelet centrally secured to the elastic membrane; and
a Fabry-Pérot resonator mounted to an outer face of the closed end of the housing, a channel being formed through the closed end of the housing such that the cavity communicates with an interior of the Fabry-Pérot resonator.

21. The hybrid membrane resonator as recited in claim 20, wherein the Fabry-Pérot resonator has a folded, substantially spiral configuration.

\* \* \* \* \*